United States Patent
Nikkeshi et al.

(10) Patent No.: US 6,359,041 B1
(45) Date of Patent: Mar. 19, 2002

(54) RESIN ADDITIVE

(75) Inventors: Susumu Nikkeshi, Miyagi-ken; Maki Kanno, Fukushima, both of (JP)

(73) Assignee: Tohoku Munekata Co Ltd, Fukushima-Ken (JP)

( * ) Notice: Subject to any disclaimer, the term of this patent is extended or adjusted under 35 U.S.C. 154(b) by 0 days.

(21) Appl. No.: 09/619,436

(22) Filed: Jul. 19, 2000

(30) Foreign Application Priority Data

Jul. 23, 1999 (JP) .............................. 11-208990

(51) Int. Cl.⁷ .................................................. C08K 5/13
(52) U.S. Cl. ........................................................ 524/72
(58) Field of Search ............................ 524/72; 426/302, 426/510, 640

(56) References Cited

U.S. PATENT DOCUMENTS 4,511,686 A * 4/1985 Millet .......................... 524/110
5,977,287 A * 11/1999 Mitchell ....................... 528/129

FOREIGN PATENT DOCUMENTS

| | | |
|---|---|---|
| DE | 3843994 A | 6/1990 |
| EP | 0818502 A | 1/1998 |
| EP | 1026131 A | 8/2000 |

* cited by examiner

Primary Examiner—Paul R. Michl

(57) ABSTRACT

Tannin obtained by dehydrating it by heating up to 70 to 230° C. to subject it to polycondensation is used as a resin additive.

13 Claims, No Drawings

RESIN ADDITIVE

DETAILED DESCRIPTION OF THE INVENTION

FIELD OF INDUSTRIAL APPLICATION

In general, polycarbonate (PC), polybutylene terephthalate (PBT), polyethylene terephthalate (PET), blends thereof and thermoplastic resins obtained by blending one or a plurality of these resins with other resins cause heat decomposition when heated and molten in various molding processes and are reduced in a molecular weight, which results in a reduction in the mechanical properties. The present invention relates to a resin additive for preventing heat decomposition in such case and a heat stabilizing method of a thermoplastic resin using the above resin additive.

PROBLEMS TO BE SOLVED BY THE INVENTION

Resin materials, particularly the respective resins of PC, PBT and PET are heavily reduced in a molecular weight in heating and melting and therefore have notably been reduced in a molecular weight by virtue of heat given in the respective molding processes and a shearing stress in kneading. Accordingly, it has been difficult to recycle sprues and runners produced in molding as well as recycling of the products. An object of the present invention is to provide a novel resin additive which inhibits the preceding reduction in a molecular weight of resin materials in heating and melting and which can turn them into recyclable materials and a heat stabilizing method of a thermoplastic resin using the above resin additive.

MEANS FOR SOLVING THE PROBLEMS

The object of the present invention described above can be achieved by:
(1) a resin additive prepared by dehydrating tannin by heating up to 70 to 230° C. to subject it to polycondensation, and
(2) a heat stabilizing method of a thermoplastic resin characterized by adding 50 to 1000 ppm of the above resin additive to the thermoplastic resin. The present invention shall be explained below in further details.

Intensive researches of an influence exerted on materials by polyhydric phenol continued by the present inventors have resulted in finding that a thermoplastic resin can be inhibited from being reduced in a molecular weight in heating and melting by adding a trace amount of tannin dehydrated by heating and thus, they have completed the present invention. The tannin used in the present invention is a general term of complicated aromatic compounds having a lot of phenolic hydroxyl groups which are widely distributed in the plant kingdom, and to roughly divide, tannin is divided into two kinds of a hydrolyzed type and a condensed type. Either of them is a natural compound, and therefore a lot of the compounds having different structures are present. Either tannin may be used in the present invention. Polyhydric phenol compounds having a dye-fixing effect and a tanning effect of leather are called "synthetic tannin" and "cintan", and among the synthetic tannins, the compounds which are effectively used can be used as well in the present invention.

Also, tannic acid is called tannin as well and shall not specifically be distinguished in the present invention.

China tannin which is typical hydrolyzed type tannin is shown by Formula (1). To further describe the China tannin, it has been apparent that the China tannin has a structure in which 10 gallic acid groups are disposed in the circumference of a glucose residue and two gallic acid groups are bonded in a vertical direction. However, the center of the compound is not necessarily restricted to glucose and is the compound of a cellulose type in a certain case. Thus, tannins are compounds contained widely in plants in the natural world, and therefore it can readily be presumed that they are partially different in a chemical structure.

Tannins including decomposition products obtained by alkaline decomposition or hydrolytic decomposition of tannin are used as well in the present invention and, for example, didepside of gallic acid shown by Formula (2) which is obtained by hydrolysis of tannin can be used as well. At present, tannin is used for daily needs such as an ink, medical uses such as a hemostatic agent and industrial uses such as a tanning agent of leather and a mordant in dyeing, and in recent years, it is used as a food additive. Further, tannins including catechin are used as well in the present invention. Catechin is a polyhydroxy derivative of 3-hydroxyflavane which is a polyhydric phenol compound and contained widely in plants in the natural world. It is said that catechin includes heterogeneous types having various molecular structures, and any ones are natural compounds, so that a lot of catechins having different structures are present. Catechin used in the present invention shall not specifically be restricted and may be any one as long as it is catechin which can effectively be used for the object of the present invention. Also, catechin is called shibu. At present, tannin is used for medical uses such as a carcinostatic agent and industrial uses such as a color fixing agent and a mordant for nylon.

Tannin preferably used in the present invention includes China tannin and 3,5,7,3',4'-pentahydroxyflavane (catechin in terms of a narrow sense). Catechin (3), quebrotannin (4) and turkey tannin (5) are shown in Formula (3), Formula (4) and Formula (5) as various tannins having different chemical structures.

(1)

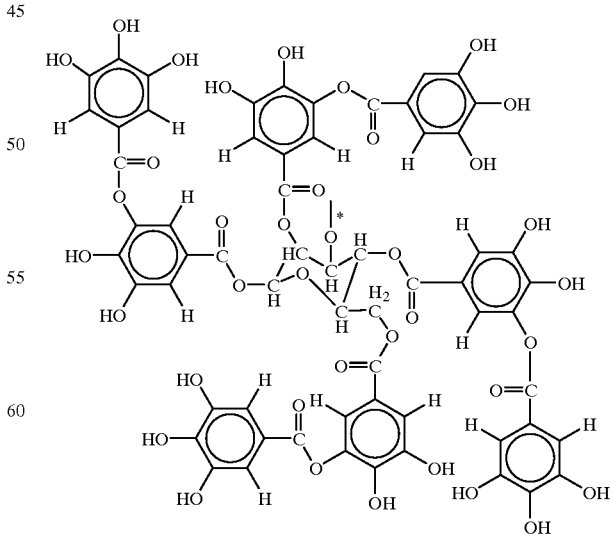

(2)

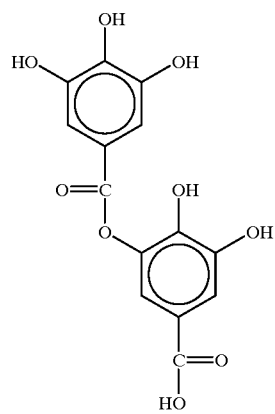

(3)

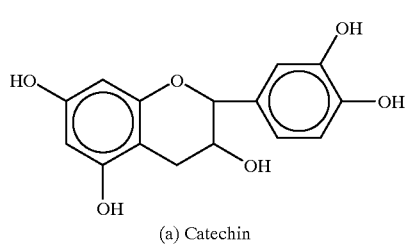
(a) Catechin

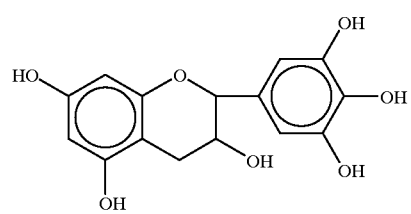
(b) epi-Gallocatechin

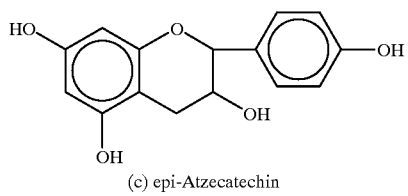
(c) epi-Atzecatechin

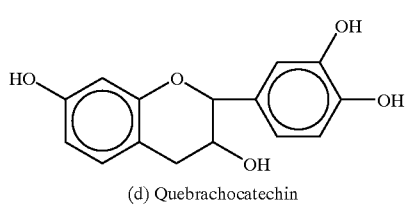
(d) Quebrachocatechin (4)

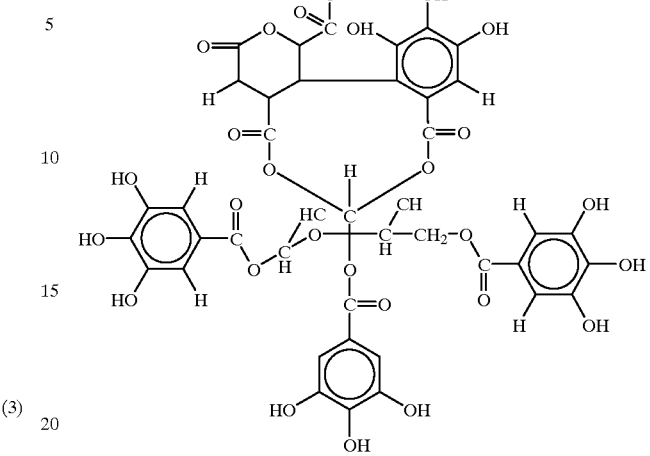

(5)

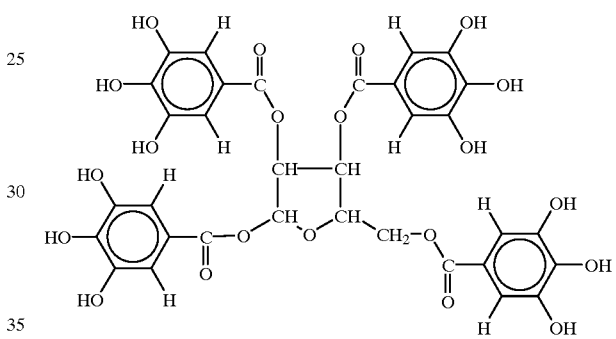

The tannin of the present invention subjected to polycondensation can be produced by heating and dehydrating tannin at a temperature of up to 70 to 230° C., preferably 90 to 160° C. In the present invention, a polycondensation product of one kind of tannin may be used or a polycondensation product of a mixture of several kinds of tannin may be used. In this case, it is important that tannin is dehydrated to some extent, and the whole thereof may not necessarily be subjected to polycondensation.

Conditions in heating and dehydrating tannin to subject it to polycondensation shall not specifically be restricted, and it is usually heated at 70° C. for about 8 hours, 230° C. for about 2 minutes and 90 to 160° C. for about 2 to 3 hours to dehydrate it. In the case of China tannin, the product which is dehydrated by not much more than 8 to 11% is preferably used.

Next, a resin to which the resin additive of the present invention is intended to be added shall not specifically be restricted, but polycarbonate resins (PC) or thermoplastic polyesters, particularly polyethylene terephthalate (PET) and polybutylene terephthalate (PBT) are suitable. Further, preferably used are blends of them and blend resins of one or a combination of a plural thereof and other resins, for example, blend resins such as PC/ABS, PBT/ABS, PC/PBT, PC/PET, PC/polystyrene and PC/PBT/polystyrene.

Polycondensation tannin is added in an amount of 50 to 1000 ppm based on the thermoplastic resin. The addition amount of less than 50 ppm is too small and does not provide so much effect. On the other hand, the addition amount exceeding 1000 ppm rather deteriorates the mechanical properties of the resin and therefore is not preferred.

Powdery polycondensation tannin may be added directly to the resin or polycondensation tannin may be dissolved in a solvent such as THF and ethanol, and this may be added to the resin. The polycondensation tannin of the present invention has the characteristic that the heat stabilizing effect of the resin is obtained by adding a very small amount of 50 to 1000 ppm thereof. Further, polycondensation tannin has the advantages that an OH group contained in tannin is reduced to some extent by polycondensation, and therefore when this is added to the thermoplastic resin, it can prevent the OH groups which are present in excess from being decomposed in heating and melting the resin and foaming in the resin to form bubbles and that it can further thermally stabilize the thermoplastic resin.

The thermoplastic resin thus obtained to which polycondensation tannin is added is inhibited from a reduction in a molecular weight in heating and melting and makes it possible to recycle the molded article.

EFFECTS OF THE INVENTION

As shown in the following examples and comparative examples, the addition of tannin subjected to heating, dehydrating and polycondensation which is the resin additive of the present invention inhibits the respective PC or polyester base resins from being reduced in a molecular weight in heating and melting. Accordingly, heat stabilization of a thermoplastic resin can be achieved by using the resin additive of the present invention.

EXAMPLES

The present invention shall be explained below in further details with reference to examples and comparative examples.

Example 1

Taken in a glass-made Petri dish was 5 g of tannic acid (China tannin extra pure reagent manufactured by Koso Chemical Co., Ltd.), and this was put in a heating oven (D-30 type manufactured by Yamato Kagaku Co., Ltd.) and heated at 160° C. for 2 hours. After heating, it was weighed to find that the weight was lost by 9%, and the lost portion in weight is considered to be moisture. The polycondensation compound of tannin thus obtained is called cTH.

Weighed was 59.00 g of a PC resin (brand name Panlite L-1250; polycarbonate resin, Mn=24700, Mw=60800, Mw/Mn=2.46, manufactured by Teijin Chemicals Co., Ltd.), and 11.8 mg of cTH was further added thereto. This mixture was put into a plastometer (Lab Plastomill 50C150 type manufactured by Toyo Seiki Mfg. Co., Ltd.) and kneaded at a temperature of 280° C. and a revolution of 32 rpm. In this case, the addition amount of cTH to PC corresponds to 200 ppm. A sample of about 0.05 g for determining a molecular weight was taken by every 10 minutes during kneading.

The samples thus obtained were subjected to determination of a molecular weight by means of a gel permeation chromatography (hereinafter abbreviated as GPC, L7000 type manufactured by Hitachi, Ltd.), wherein a THF (tetrahydrofuran) solution of the sample having a concentration of about 0.05 wt % was allowed to flow at a pressure of 10 kg/cm$^2$ and a discharge amount of 0.5 ml/minute using THF as a carrier solvent and a detector RI. The results thereof are shown in Table 1. The virgin pellet of PC had an Mn of 24700.

Comparative Example 1

The same procedure as in Example 1 was repeated, except that cTH was not added. The results thereof are shown in Table 1 together.

Example 2

The same procedure as in Example 1 was repeated, except that cTH was changed to catechin (pharmaceutical codex catechin manufactured by Fuji Chemical Ind. Co., Ltd.). The results thereof are shown in Table 1 together. cl Example 3

The same procedure as in Example 1 was repeated to determine the molecular weight, except that cTH was added so that the addition amount of cTH became 50, 100 and 1000 ppm, respectively. The results thereof are shown in Table 2.

Comparative Example 2

The same procedure as in Example 3 was repeated to determine the molecular weight, except the addition amount of cTH was controlled so that the concentration became 30 and 2000 ppm. The results thereof are shown in Table 2 together.

Example 4

Polycondensation tannin used in Example 1 was added to a PBT resin (Duranex 3200 manufactured by Polyplastics Co., Ltd.), PET (Kurapet 1030 manufactured by Kuraray Co., Ltd.), a PC/ABS alloy (Ubelloy CX104 manufactured by Ube Cycon Co., Ltd.) and a PBT/ABS alloy (Novalloy B1500 manufactured by Daicel Chemical Ind. Co., Ltd.) respectively so that the concentration was 200 ppm, and each 10 kg thereof was prepared. The whole amount thereof was put into an injection molding machine (IS-170 type manufactured by Toshiba Machinery Co., Ltd.) and molded into a plate of 240 mm×200 mm×2.4 mm on the conditions of a nozzle temperature of 280° C., an injection pressure of 995 kgf/cm$^2$, a holding pressure of 595 kgf/cm$^2$, an injection time of 1.61 seconds and a pressure-holding time of 21.4 seconds. This plate was crushed by means of a crusher (FNSK-15D manufactured by Nissui Kako Co., Ltd.). About 50 g of the sample for determining an MI was taken out of the crushed resin, and all of the remainder was injection-molded four times on the same conditions. Melt flow (MI value) of the crushed sample obtained above was determined by means of a melt indexer (C-50 type manufactured by Toyo Seiki Mfg. Co., Ltd.) in terms of an MI value. In essence, deterioration of a resin has to be evaluated by a molecular weight, but the respective resins given above are not dissolved in THF used for determining a molecular weight, and therefore the molecular weights can not directly be measured. On the other hand, an MI value is correlative to a molecular weight, and therefore the evaluation was given in terms of the MI value. It is a matter of course that the lower the MI value is, the larger the molecular weight is and that an increase in the MI value shows a reduction in the molecular weight. The results thereof are shown in Table 3.

Comparative Example 3

The same procedure as in Example 4 was repeated, except that polycondensation tannin was not added. The results thereof are shown in Table 3 together.

TABLE 1

Change in number average molecular weight after each kneading time

| | minute | | | | |
|---|---|---|---|---|---|
| | 10 | 20 | 30 | 40 | 60 |
| Example 1 | 23700 | 23500 | 23100 | 22800 | 22200 |
| Comparative Example 1 | 23500 | 22900 | 22100 | 21600 | 21000 |
| Example 2 | 23600 | 23100 | 22900 | 22700 | 22400 |

TABLE 2

Change in number average molecular weight when changing the addition concentration of cTH

| | | minute | | | | |
|---|---|---|---|---|---|---|
| | | 10 | 20 | 30 | 40 | 60 |
| Example 3 | 50 (ppm) | 23500 | 23000 | 22700 | 22100 | 21300 |
| | 100 (ppm) | 23800 | 23400 | 23100 | 22900 | 22300 |
| | 1000 (ppm) | 23600 | 23000 | 22600 | 22400 | 21900 |
| Comparative Example 2 | 30 (ppm) | 23300 | 22800 | 22300 | 21900 | 21200 |
| | 2000 (ppm) | 23300 | 22400 | 21800 | 21400 | 20500 |

TABLE 3

Change in MI values after each injection molding

| | | Frequency | | | |
|---|---|---|---|---|---|
| | | First | Second | Third | Fourth |
| Example 4 | PBT | 19 | 21 | 23 | 28 |
| | PET | 15 | 17 | 19 | 23 |
| | PC/ABS | 17 | 21 | 27 | 30 |
| | PBT/ABS | 18 | 21 | 25 | 29 |
| Comparative Example 3 | PBT | 21 | 25 | 30 | 39 |
| | PET | 15 | 20 | 26 | 30 |
| | PC/ABS | 18 | 27 | 35 | 41 |
| | PBT/ABS | 20 | 26 | 33 | 40 |

What is claimed is:

1. A method of heat stabilizing a moldable thermoplastic resin comprising adding to the moldable thermoplastic resin 50 to 1000 ppm of a heat stabilizing additive comprising a polycondensed tannin, which is prepared by heating the tannin at a temperative of 70 to 230° C.

2. The heat stabilizing method of claim 1, wherein the moldable thermoplastic resin is a polycarbonate base resin or a thermoplastic resin containing the polycarbonate base resin.

3. The heat stabilizing method of claim 1, wherein the moldable thermoplastic resin is a polyester base resin or a thermoplastic resin containing the polyester base resin.

4. A moldable heat stabilized thermoplastic resin composition comprising moldable a thermoplastic polycarbonate or polyester resin and 50 to 1000 ppm of a heat stabilizing additive, wherein the heat stabilizing additive comprises a polycondensed tannin which is prepared by heating the tannin at a temperature of 70 to 230° C. for two minutes to 8 hours to carry out the polycondensation.

5. The moldable heat stabilized thermoplastic resin composition of claim 4, wherein the polycondensed tannin is prepared by heating the tannin at a temperature of 90–160° C. for 2–3 hours.

6. The moldable heat stabilized thermoplastic resin composition of claim 4, wherein the tannin undergoes dehydration during the heating and polycondensation to remove 8 to 11% of its weight due to dehydration.

7. The moldable heat stabilized thermoplastic resin composition of claim 4, wherein the tannin is selected from the group consisting of China tannin and 3,5,7,3',4'-pentahydroxyflavane and mixtures thereof.

8. The moldable heat stabilized thermoplastic resin composition of claim 4, wherein the thermoplastic resin comprises a polycarbonate resin.

9. The moldable heat stabilized thermoplastic resin composition of claim 4, wherein the thermoplastic resin comprises a polyester resin.

10. A method of heat stabilizing a moldable thermoplastic polycarbonate or polyester resin comprising adding to the moldable thermoplastic resin 50 to 1000 ppm of a heat stabilizing additive, wherein the heat stabilizing additive comprises a polycondensed tannin which is prepared by heating tannin at a temperature of 90–160° C. for 2–3 hours to carry out the polycondensation.

11. The method of heat stabilizing the moldable thermoplastic resin of claim 10, wherein the tannin undergoes dehydration during the heating and polycondensation to remove 8 to 11% of its weight due to dehydration.

12. The method of heat stabilizing the moldable thermoplastic resin of claim 10, wherein the thermoplastic resin comprises a polycarbonate resin.

13. The method of heat stabilizing the moldable thermoplastic resin of claim 10 wherein the thermoplastic resin comprises a polyester resin.

* * * * *